(12) United States Patent
Huang et al.

(10) Patent No.: US 7,595,944 B2
(45) Date of Patent: Sep. 29, 2009

(54) OPTICAL ACTUATOR

(75) Inventors: Chun-Chieh Huang, Taipei (TW);
Chau-Yuan Ke, Ping Tung County (TW)

(73) Assignee: Industrial Technology Research Institute, Hsinchu (TW)

( * ) Notice: Subject to any disclaimer, the term of this patent is extended or adjusted under 35 U.S.C. 154(b) by 95 days.

(21) Appl. No.: 11/828,316

(22) Filed: Jul. 25, 2007

(65) Prior Publication Data
US 2008/0297934 A1 Dec. 4, 2008

(30) Foreign Application Priority Data
Jun. 4, 2007 (TW) .................. 96119927 A

(51) Int. Cl.
G02B 7/02 (2006.01)
G03B 3/10 (2006.01)
G11B 17/00 (2006.01)

(52) U.S. Cl. .............. 359/822; 359/814; 359/823; 359/824; 369/44.16; 369/244.1; 396/55; 396/133; 310/12; 381/396

(58) Field of Classification Search .......... 359/813, 359/814, 819, 820, 822–824; 310/12, 14, 310/66, 67 R, 91; 369/44.14–44.16, 44.37, 369/112.23, 126, 127, 244; 396/52, 55, 133, 396/439; 381/396, 398, 403, 423, 424; 348/335, 348/E5.046; 335/22

See application file for complete search history.

(56) References Cited

U.S. PATENT DOCUMENTS

| | | | |
|---|---|---|---|
| 5,289,320 A | 2/1994 | Kobayashi | |
| 5,805,937 A | 9/1998 | Kitagawa | |
| 5,852,749 A | 12/1998 | Konno et al. | |
| 6,594,450 B1 | 7/2003 | Kao | |
| 6,608,541 B2 | 8/2003 | Shiraki et al. | |
| 6,856,469 B2 | 2/2005 | Yoneyama et al. | |
| 6,961,090 B2 | 11/2005 | Oshima | |
| 7,236,607 B2 * | 6/2007 | D'Hoogh | 381/396 |
| 7,291,942 B2 * | 11/2007 | Osaka | 310/12 |
| 7,298,564 B2 * | 11/2007 | Rouvinen et al. | 359/824 |

* cited by examiner

*Primary Examiner*—Loha Ben
(74) *Attorney, Agent, or Firm*—Quintero Law Office

(57) ABSTRACT

An optical actuator is disclosed. The optical actuator includes a seat bearing the optical element, a yoke comprising an end, a suspension system comprising at least one spring sheet connecting the seat and the end, and a driving device moving the seat relative to the yoke. The spring sheet constrains the movement of the seat. The spring sheet includes an inner connecting portion connected to the seat, an outer connecting portion surrounding the inner connecting portion and connected to the end, and a spring structure disposed between the inner and outer connecting portions and connecting the inner and outer connecting portions.

17 Claims, 3 Drawing Sheets

OPTICAL ACTUATOR

BACKGROUND OF THE INVENTION

1. Field of the Invention

The invention relates to an optical actuator, and in particular relates to an optical actuator driven in three axes.

2. Description of the Related Art

A conventional optical actuators are usually driven in one or two axes. The conventional optical actuators are disclosed in U.S. Pat. Nos. 6,961,090, 5,289,320, 6,594,450, 5,805,937, 5,852,749, 6,608,541, 6,856,469, wherein U.S. Pat. Nos. 6,961,090, 5,289,320, 6,594,450, 6,608,541 and 6,856,469 disclose the optical actuators driven in one axis. The U.S. Pat. Nos. 5,805,937 and 5,852,749 disclose the optical actuators driven in two axes.

BRIEF SUMMARY OF INVENTION

An embodiment of an optical actuator of the invention comprises a seat bearing the optical element, a yoke comprising an end, a suspension system comprising at least one spring sheet connecting the seat and the end, and a driving device moving the seat relative to the yoke, wherein the spring sheet constrains the movement of the seat.

The spring sheet comprises an inner connecting portion connected to the seat, an outer connecting portion surrounding the inner connecting portion and connected to the end, and a spring structure disposed between the inner and outer connecting portions and connecting the inner and outer connecting portions.

The spring structure comprises a spring body having a wavy shape and an inner connecting portion enclosed by the spring body to be a closed two dimensional shape.

The spring body is connected to the inner connecting portion in a plurality of positions. The spring body is connected to the outer connecting portion in a plurality of positions.

The spring sheet has a two dimensional shape which has isotropic stiffness. The spring sheet has stiffness in a direction perpendicular to the two dimensional shape, which is different from the isotropic stiffness.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1:
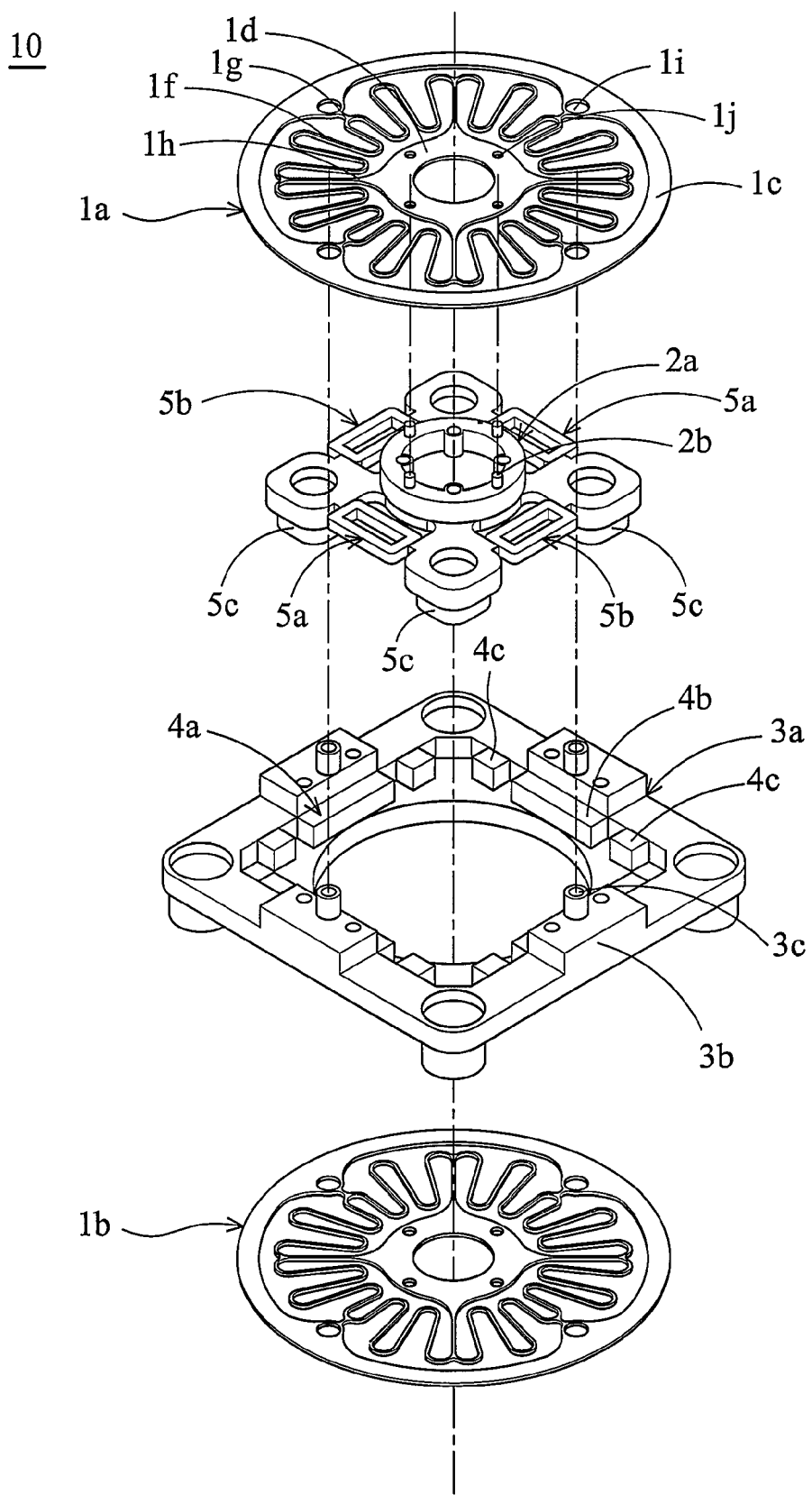
FIG. 1 is an exploded view of an optical actuator of the invention.
Figure 2:
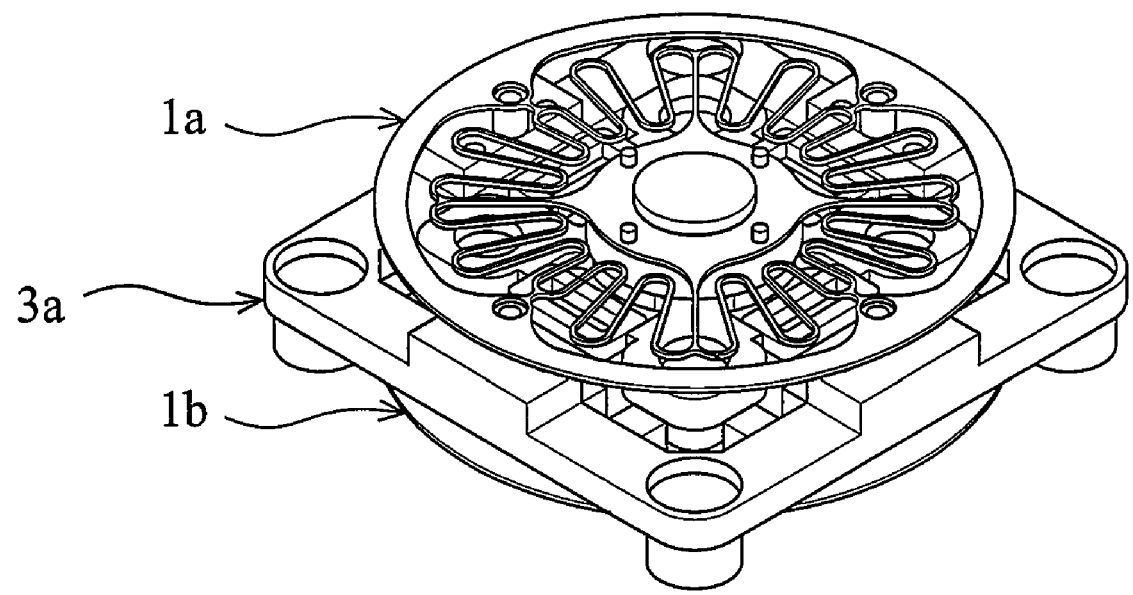
FIG. 2 is a perspective view of an optical actuator of the invention.
Figure 3:
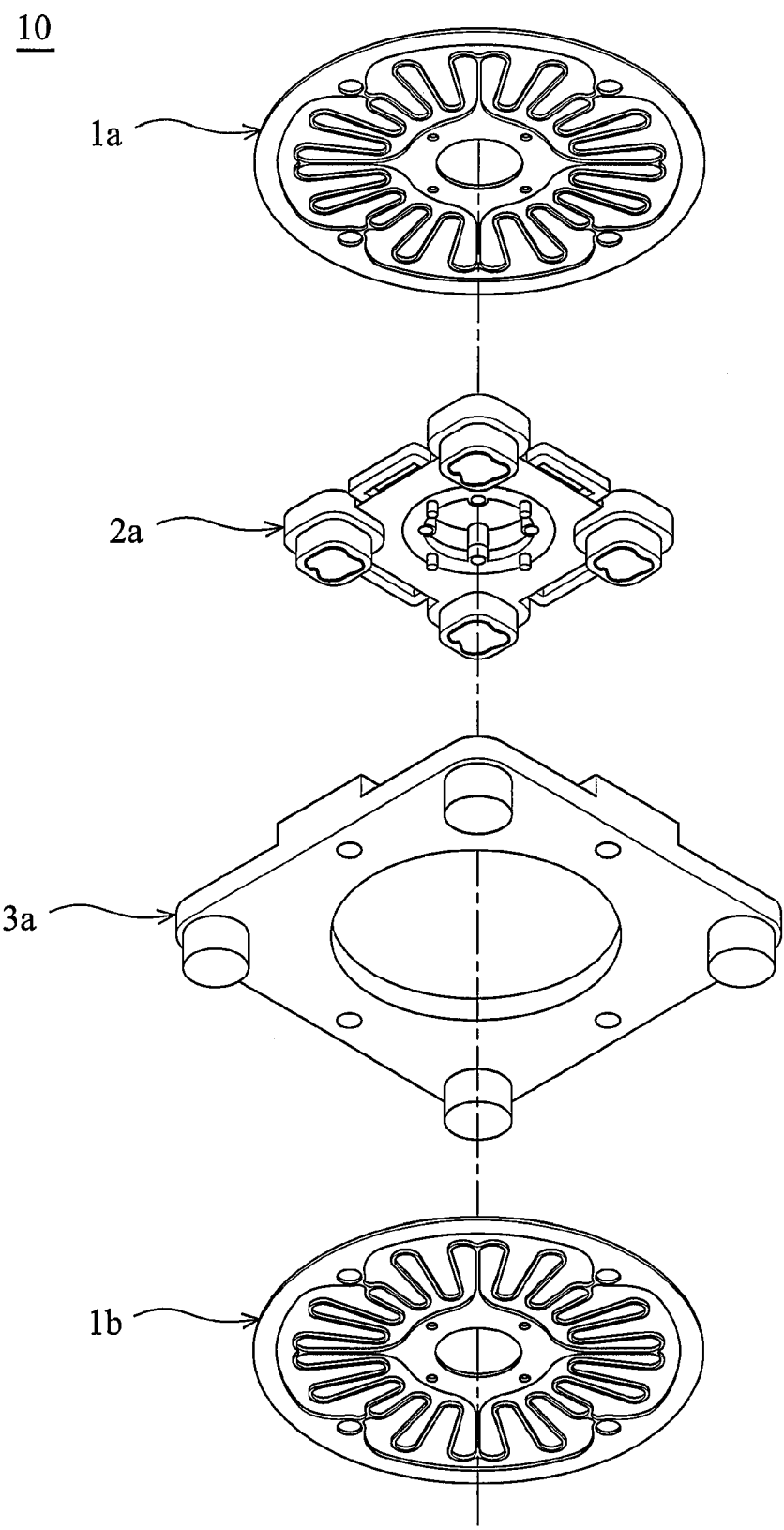
FIG. 3 is another exploded view of the optical actuator of FIG. 1.

Referring to FIGS. 1, 2 and 3, an optical actuator 10 comprises a pair of spring sheets 1a and 1b, a seat 2a and a yoke 3a. The seat 2a bears an optical element (not shown). The yoke 3a is fixed to an optical device (not shown). The spring sheets 1a and 1b constitute a suspension device which joins the seat 2a to the yoke 3a movably. The structure of the spring sheets 1a and 1b as described as follows.

The spring sheet 1a can be identical to or different from the spring sheet 1b. The spring sheets 1a and 1b are identical in this embodiment. The spring sheet 1a has a two dimensional shape and comprises an outer connecting portion 1c, an inner connecting portion 1d and a spring structure 1f. In this embodiment, the outer connecting portion 1c is circular, and the inner connecting portion 1d is also circular. The outer connecting portion 1c encloses the inner connecting portion 1d, and the outer connecting portion 1c and the inner connecting portion 1d are concentric. The spring structure 1f is a wavy spring body and encloses the inner connecting portion 1d to be a closed two dimensional shape, as shown in FIGS. 1, 2 and 3, a flower-like shape. The spring structure 1f is disposed between the outer connecting portion 1c and the inner connecting portion 1d, connected to the outer connecting portion 1c in a plurality of positions 1g, and connected to the inner connecting portion 1d in a plurality of positions 1h. In such a structure, the spring sheet 1a has isentropic stiffness in the two dimensional shape, the elastic coefficient k is substantially constant for all directions in the two dimensional shape. The stiffness in the direction perpendicular to the two dimensional shape is different from the stiffness in the directions parallel to the two dimensional shape.

The outer connecting portion 1c has a plurality of through holes 1i corresponding to through holes 3c on the end 3b of the yoke 3a. The spring sheet 1a is fixed to the yoke 3a by bolts which extend through the through holes 1i and 3c. The inner connecting portion 1d has a plurality of through holes 1j corresponding to pins 2b on the seat 2a. The seat 2a is fixed to the spring sheet 1a by the pins 2b which extend through the through holes 1j. The spring sheet 1b is disposed under the yoke 3a, and joined to the yoke 3a and the seat 2a in a way similar to the spring sheet 1a. Hence, the seat 2a is movably joined to the yoke 3a by the spring sheets 1a, 1b.

The optical actuator 10 of the invention further comprises a driving device moving the seat 2a along three directions. The driving device comprises a magnet 4a for an X axis, a magnet 4b for a Y axis, a magnet 4c for a Z axis, a coil 5a for the X axis, a coil 5b for the Y axis and a coil 5c for the Z axis. The magnets 4a, 4b and 4c are disposed on the yoke 3a, and the corresponding coils 5a, 5b and 5c are disposed on the seat 2a. The Lorentz force generated between the magnets and coils moves the seat 2a along three directions. The spring sheets 1a and 1b constrain the movement of the seat 2a. As the spring sheets 1a, 1b are positioned in the coordinate plane formed by the X axis and the Y axis, the seat 2a moves linearly in the X axis and the Y axis due to the isentropic stiffness of the spring sheets 1a, 1b along the X and Y axes. Because the stiffness of the spring sheet 1a and 1b along the Z axis is larger than the stiffness along the X and Y axes, the seat 2a is prevented from sinking by the stiffness of the spring sheets 1a and 3b balancing the weight of the seat 2a.

In addition to the magnets and coils, motors and piezoelectric elements can also be applied to the driving device of the invention. The shape of the spring sheet 1a and 1b is not limited to a circular shape, a polygon shape can also be applied.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. An optical actuator for an optical element, comprising:
a seat bearing the optical element;
a yoke comprising an end;
a suspension system comprising at least one spring sheet connecting the seat and the end; and
a driving device disposed corresponding to the seat to move the seat relative to the yoke, wherein the spring sheet is configured to have
an inner connecting portion connected to the seat;
an outer connecting portion surrounding the inner connecting portion and connected to the end; and
a spring structure having a spring body with a wavy shape, enclosing the inner connecting portion, disposed between the inner and outer connecting portions, and connecting the inner and outer connecting portions, whereby the spring constrains the movement of the seat.

2. The optical actuator as claimed in claim 1, wherein the spring body is in a two dimensional shape.

3. The optical actuator as claimed in claim 2, wherein the spring body is connected to the inner connecting portion in a plurality of positions.

4. The optical actuator as claimed in claim 2, wherein the spring body is connected to the outer connecting portion in a plurality of positions.

5. The optical actuator as claimed in claim 2, wherein the seat is moved approximate linear or linearly by the driving device and the spring body.

6. The optical actuator as claimed in claim 2, wherein the spring sheet has a two dimensional shape which has isotropic stiffness.

7. The optical actuator as claimed in claim 6, wherein the spring sheet has stiffness in a direction perpendicular to the two dimensional shape, which is different from the isotropic stiffness.

8. The optical actuator as claimed in claim 1, wherein the inner connecting portion is circular or a polygon.

9. The optical actuator as claimed in claim 1, wherein the outer connecting portion is circular or a polygon.

10. The optical actuator as claimed in claim 1, wherein the driving device comprises:
at least one coil disposed on the seat; and
at least one magnet disposed on the yoke and corresponding to the coil, wherein
electromagnetic force is generated by the coil and the magnet to move the seat which is constrained by the spring sheet.

11. The optical actuator as claimed in claim 1, wherein the driving device comprises:
a first coil disposed on the seat; and
a first magnet disposed on the yoke and corresponding to the first coil, wherein
electromagnetic force is generated by the first coil and the first magnet to move the seat in a first direction.

12. The optical actuator as claimed in claim 11, wherein the driving device further comprises:
a second coil disposed on the seat; and
a second magnet disposed on the yoke and corresponding to the second coil, wherein
electromagnetic force is generated by the second coil and the second magnet to move the seat in a second direction.

13. The optical actuator as claimed in claim 12, wherein the first direction is perpendicular to the second direction.

14. The optical actuator as claimed in claim 12, wherein the driving device further comprises:
a third coil disposed on the seat; and
a third magnet disposed on the yoke and corresponding to the third coil, wherein
electromagnetic force is generated by the third coil and the third magnet to move the seat in a third direction.

15. The optical actuator as claimed in claim 14, wherein the third direction is perpendicular to the first direction and the third direction is perpendicular to the second direction.

16. The optical actuator as claimed in claim 1, wherein the driving device comprises a motor.

17. The optical actuator as claimed in claim 1, wherein the driving device comprises a piezoelectric element.

* * * * *